United States Patent [19]
Tripp et al.

[11] Patent Number: 4,938,450
[45] Date of Patent: Jul. 3, 1990

[54] PROGRAMMABLE PRESSURE REDUCING APPARATUS FOR THROTTLING FLUIDS UNDER HIGH PRESSURE

[75] Inventors: Dale S. Tripp, Coram; Ronald Beauman, Hicksville, both of N.Y.

[73] Assignee: Target Rock Corporation, East Farmingdale, N.Y.

[21] Appl. No.: 359,114

[22] Filed: May 31, 1989

[51] Int. Cl.⁵ .............................................. F16K 47/04
[52] U.S. Cl. .................................. 251/30.03; 251/127; 137/625.3; 137/625.38; 138/43
[58] Field of Search .......................... 251/127, 30.03; 137/625.3, 625.38; 138/43

[56] References Cited
U.S. PATENT DOCUMENTS

| | | | |
|---|---|---|---|
| 3,513,864 | 5/1970 | Self | 137/625.3 X |
| 3,688,800 | 9/1972 | Hayner et al. | 137/625.3 X |
| 4,279,274 | 7/1981 | Seger | 137/625.3 X |
| 4,398,563 | 8/1983 | Kay et al. | 251/127 X |

Primary Examiner—Arnold Rosenthal
Attorney, Agent, or Firm—Hoffman & Baron

[57] ABSTRACT

Programmable pressure reducing apparatus for throttling fluids under high energy in which standardized parts can be stacked and nested to achieve a wide range of restriction and expansion points interposed in tortuous fluid flow paths which divide and recombine the fluid a plurality of times to dissipate high energy without incurring cavitation.

15 Claims, 3 Drawing Sheets

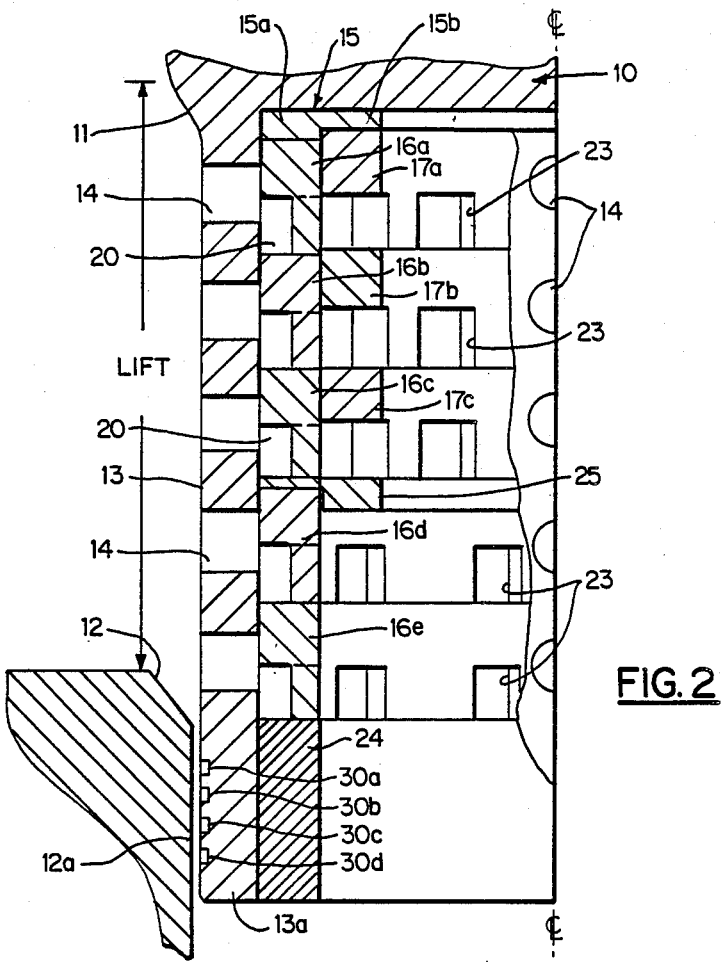
FIG. 2
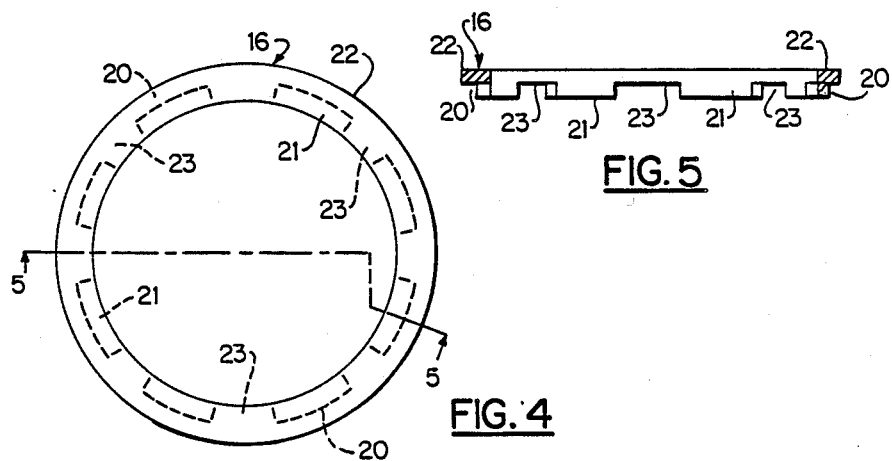
FIG. 4
FIG. 5

PROGRAMMABLE PRESSURE REDUCING APPARATUS FOR THROTTLING FLUIDS UNDER HIGH PRESSURE

This invention relates to throttling fluid flow in pressure systems in which the energy levels are so high that cavitation, with its attendant damage is likely, or where gas velocities can cause objectionable noise and possible erosion.

BACKGROUND OF THE INVENTION

Orderly, controlled and quiet energy dissipation in fluid systems of both the compressible and incompressible type has presented a continuing challenge to the engineering profession. While the principles are now understood and the prior art reflects many attempts to implement them, the solutions are complicated and costly.

THE PRIOR ART

Three related but different approaches to fluid throttling are known. Each utilizes tortuous flow paths through many expansion chambers and restricting orifices to create multi stage dissipation of the energy. If energy conversion can be kept sufficiently low at each stage, cavitation and excessive noise can be controlled. Nested and drilled relatively rotatable cylinders are shown in U.S. Pat. No. 4,249,574 as the dissipating element in a throttling valve. The holes are critically placed for fractional overlapping to create restriction orifices and the cylinder wall thickness as are varied to create expansion chambers. Stacked, double-sided milled plates are shown in U.S. Pat. No. 4,279,274, to achieve flow path which provide restriction orifices and expansion areas with multiple division of flow paths, planar changes in flow direction, and impinging flow paths to more gradually extract the energy.

A further refinement of the nested cylinder approach utilizes a combination of drilled holes and grooved surface channels to avail of the split and recombinant flow principle.

In all of the known systems it is not possible, without extreme cost, to achieve controlled pressure or velocity profiles at every stage of pressure reduction to meet the range of known applications. The limitations of planar, that is two-dimensional flow patterns is believed to be one of the reasons for the inflexibility of such prior art designs.

BRIEF SUMMARY OF THE INVENTION

In accordance with the present invention a third flow dimension is added to the principle of split, constricted, expanded combined, turned, and impinging flow, and it is achieved using large numbers of the same, easily fabricated part, together with means for achieving an almost limitless pressure profile at every stage of the pressure drop.

Applied, for example, to a conventional valve body and disc, there is provided a cylindrical sleeve extension on the disc beyond the seating surface, perforated by a uniform slot pattern to provide a plurality of axially spaced tiers of equally and circumferentially spaced holes.

The interior of the sleeve contains tiers of nested and slotted staging rings in variable numbers to match the design criteria of the project as to the number of stages of pressure reduction and the volume requirements of each stage. The rings and sleeve are relatively adjustably movable axially and circumferentially, and their positions fixed by a simple programming disc which allows the user to achieve the desired pressure profile at each stage. The number of stages and the number of tiers in each stage can be varied as needed at substantial savings in part costs, and the axial adjustability of the rings adds a third dimension to the fluid flow pattern.

DESCRIPTION OF THE DRAWINGS

FIG. 2 is a view in enlarged scale and in vertical section of one half of a programmable pressure reducer illustrating both 2 and 3 stages of pressure drop and two tiers of reducers of differing depths and programming;

FIG. 4 is a plan view of one basic staging ring configuration; and

FIG. 5 is a view in vertical section taken on the line 5—5 of FIG. 4.

DESCRIPTION OF THE PREFERRED EMBODIMENTS OF THE INVENTION

Figure 1:
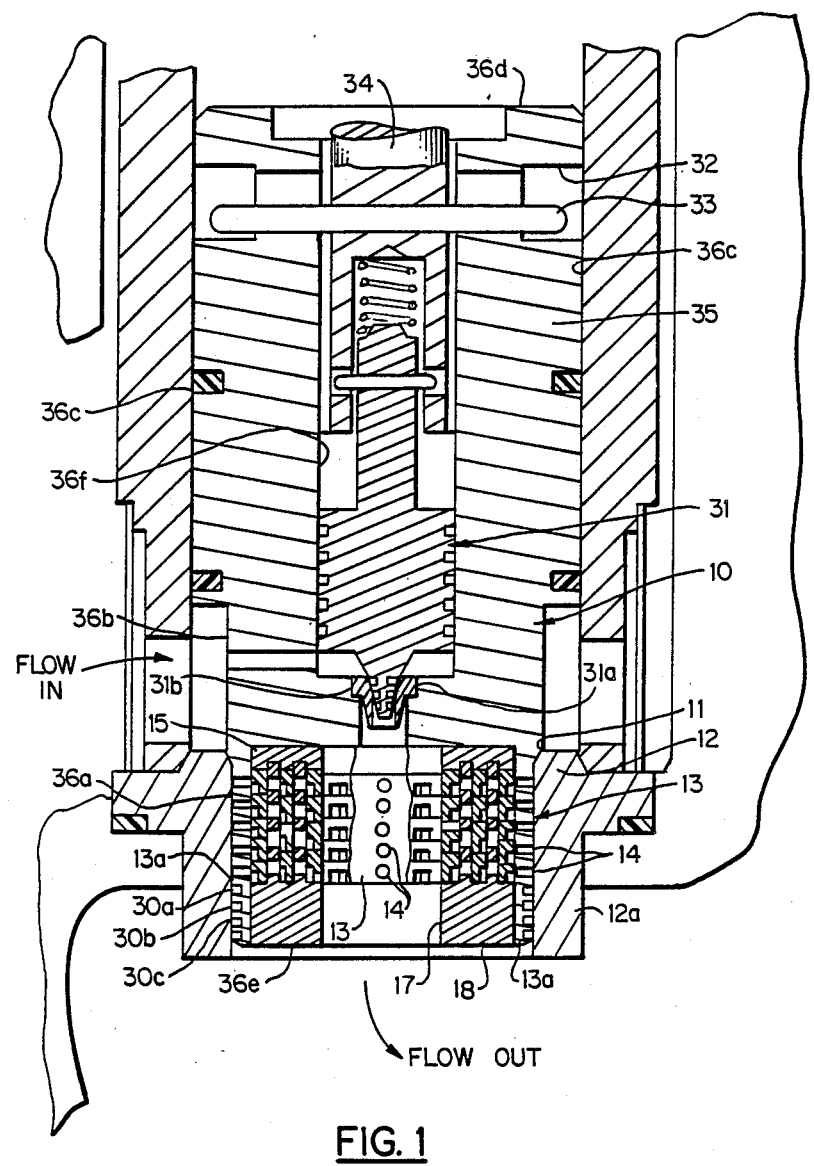
FIG. 1 is a view in vertical section of the seat and disc of a valve embodying the programmable pressure reducing assembly of the present invention.

Referring to FIGS. 1 and 2, there is shown a movable valve disc 10 having a seating surface 11 adapted to engage a fixed seat 12. Carried by the lower end of the disc 10 is a cylindrical sleeve 13 formed with five tiers of circumferentially arrayed fluid passages 14, preferably drilled. In the illustrated embodiment there are 8 equally circumferentially spaced passages 14 in each tier. The disc 10 is shown engaged with its seat 12 to shield all tiers of passages from the high pressure side of the valve, but as the valve lifts (FIG. 2) the tiers are progressively exposed to the flow. Mounted in the sleeve 13 is a programming ring 15, described more fully below, and five concentric and nested staging rings. In FIG. 2 which is in enlarged scale and simplified as to the numbers of elements there is shown two staging rings 16a and 17a in the first tier, two rings 16b and 17b in the second tier, two rings 16c and 17c in the third tier, single rings and 16d and 16e in the fourth and fifth tiers, respectively. The staging rings are broken away at the center to show the inside of sleeve 13 and one of the passages 14 in each. The assembly is completed by a composite disc 18 in FIG. 1 and 24 in FIG. 2. With parts arranged in their correct axial and circumferential spacings, all as described below, to establish the desired pressure profile, the parts are secured in position, preferably by brazing, to seal all leakage flow paths between mating surfaces. It will be understood that by substituting discs with different numbers of tiers and stages and differently programmed axial placements, the same valve can be made to accommodate different flow volumes at different pressures and also accommodate different fluids, compressible and incompressible.

Referring to FIGS. 4 and 5, there is shown the configuration of a typical staging ring 16. The ring is formed with annular fluid flow channel 20 defined by an axially depending wall 21 and an upper radially extending wall 22. The cross section of the ring is essentially square with the lower outside corner portion removed to form the fluid channel 20, which when the system is in operation will constitute an expansion volume. The axially depending wall is formed with slot 23 which define constriction passages which vent the annular fluid channel radially inwardly.

For convenience and efficiency of machining the slots 23 are at diametrically spaced points, and preferably a complete tier of nested rings may be slotted at the same time. The widths and numbers of the slots is predetermined by calculation. In the illustrated embodiment, there are 8 equally spaced slots, the centers of which are at 45° intervals. The staging rings of any given stage of pressure reduction will be identical in size and geometry.

Referring to FIG. 2, there is shown a 3 stage assembly for tiers 1–3 and two (2) stages for tiers 4 and 5 in which the second and third stages are axially programmed differently. As in FIG. 1, the stages are all nested within the apertured cylindrical sleeve 13 carried at the end of the disc 10, which is shown fully raised from the seat 12. The free end of the sleeve 13 carries an extension 13a which with the valve open fits within the lower portion 12a of the seat 12 with slight clearance 30 through which fluid under pressure flows at high and potentially damaging velocity. To prevent damage the extension is formed with a series of expansion chambers 30a, b and c in the form of circular grooves which dissipate the fluid energy as the flow cascades through the chambers.

The program disc 15 contains 2 steps 15a and 15b for stages 1 and 2 respectively against which are seated the nested staging rings 16a and 17a. The step 15a in the programming ring 15 causes the annular fluid channel 20 in the staging ring 16a to move out of full alignment or register with the hole 14 in the sleeve 13, thus eclipsing the passage for, say, one half of its area. The next two staging tiers 16b and 16c below the ring 16a will be identically displaced to establish identical throttling passages. A supplemental or secondary programming disk 25 between the staging rings 16c and 16d establishes a further axial displacement below and thus provides further constriction at the interface between the sleeve passage 14 and the annular flow channels 20. A composite disc 24 brazed in position terminates the stack comprising stage 1.

The step 15b on the programming ring 15, shorter than the step 15a, positions the staging ring 17a slightly upwardly and therefore slightly out of full registration with a radial passage or slot 23 formed in the proximate axially extending wall 21 of the ring 16a, thus forming a constriction which is larger than that between the hole 14 in the sleeve 13 and the annular channel 20 of the staging ring 16a. In addition the staging ring 17a is rotated to place its radial passages or slots 23 exactly half way between each pair of corresponding slots 23 in the ring 16a (in the manner shown in FIGS. 3A and 3B).

The stacked rings 17b and 17c of stage 2 are also positioned axially by the step 15b of the program disc 15 in the same relationship to their outwardly nested rings as mating rings 16b, 16c. Thus completing tiers 2 and 3 for stage 2. The circumferential positioning of the slots is also identical, thus ensuring equal division of the fluid flow paths, all as described below. The composite disc 25 secures the stacked rings of stage 2. The entire assembly is brazed at all contiguous surfaces to integrate the structure and prevent by-pass leakage. As a result tiers 1–3 have profiles different than tiers 4 and 5 at the same radial location. The examples of programming by the discs 15 and 25 and of providing different numbers of elements in the tiers of the respective stages is intended to be illustrative of how the invention can be used to achieve an extensive number of different pressure profiles in the fluid flow through the system as the valve opens and is not, therefore, intended to represent a practical operating system.

Inherent in all systems, however, is the splitting, recombining, contracting, impinging, frictionally dissipating, expanding and turning of the flow paths to provide an extremely tortuous path able to control cavitation, noise, and erosion at extremely high energy levels. These flow paths, in a typical system are best seen having reference to FIGS. 3, 3A and 3B.

Figure 3:
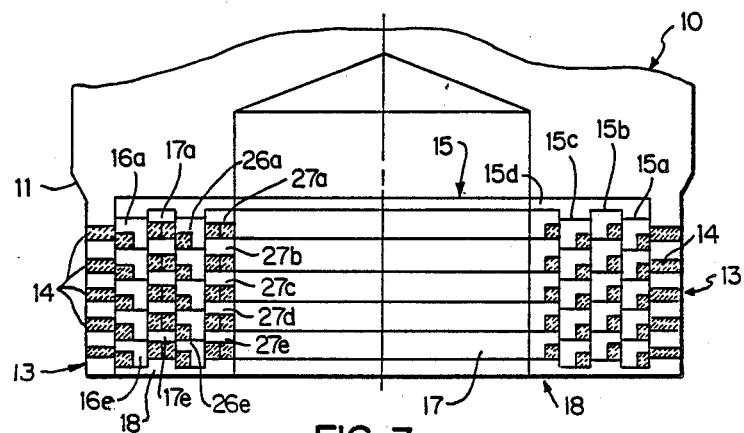
FIG. 3A is a fragmentary view in vertical section along a staggered section line of 3 tiers of a 5-stage reducer illustrating flow direction changes along the Z axis.
FIG. 3B is a fragmentary view in horizontal section of 5 stages of pressure reduction corresponding to FIG. 3A and showing flow direction changes in the X-Y plane.

In the arrangement of FIG. 3 assembly parts corresponding to FIG. 1 are identified by like reference numerals. The assembly differs by the addition of two more staging rings 26 a, b, c, d and e and 27 a, b, c, d and e. This adds 2 more stages of pressure reduction (five in all) one at the interface of rights 26 a, b, c, d and e with 27 a, b, c, d, and e along wall 19 and one at the discharge orifice of rings 27 a–e. The programming disc or ring 15 includes two additional axial spacing steps 15c and 15d.

Figure 3A:
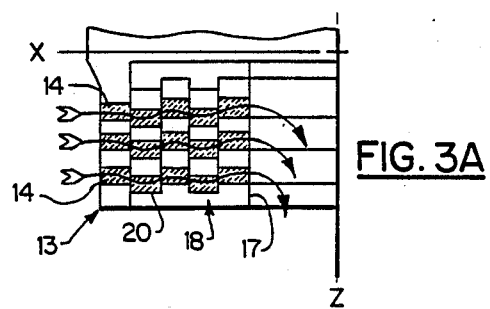
Figure 3B:
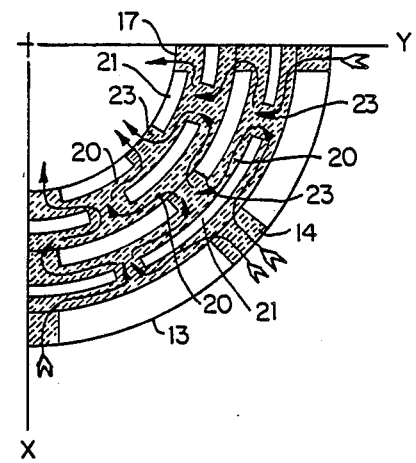

The fluid flow passages in each of FIGS. 3, 3A and 3B are indicated by broken shading lines. The flow from the high pressure side into the shaded area 20 is through the constriction formed at the passage 14 in sleeve 13. This constriction has been reduced by the action of the programming step 15a of the programming disc 15. At this point the fluid flow through each of the forty passages 14 divides equally (FIG. 3a and b) to flow in opposite directions in the annular channels 20 of the staging rings, with the channel serving as recovery or expansion chambers. The sleeve 13 divides the flowstream into 40 parts through passage 14, followed by recombination in annulus 20.

It will be seen that the staging rings 16a–e are rotated circumferentially to bring their fluid passage slots 23 to a point midway between the passages 14 of the sleeve, thus establishing the equal division of the flow and at the same time an impingement and 90° change in flow direction. The slots 23 of the rings 16a–e at the interface with the annular channel 20 of rings 17a–e forms the second constriction or pressure dropping stage. At the entrance to this stage fluids flowing from opposite directions merge and recombine, with attendant energy losses, before the ensuing constricted flow in stage two. The next inner nested staging rings 17a–e are displaced circumferentially in the opposite direction to space their slots 23 midway between the slots of the rings 16a–e (and therefore, in radial alignment with the passages 14 in the sleeve 13). In this fashion the process of energy dissipation carries on in cascading fashions until the flow reaches the inner cylindrical discharge opening 17 defined by the inside diameter of the innermost rings 27a–e. In this space diametrically opposed streams will impinge on each other and flow direction will change by 90°, providing further dissipation of energy. The diameter of the discharge opening should be large enough to limit exit flow velocities from the system.

FIG. 3A illustrates a particular feature of the invention in which further energy is dissipated by five successive changes in the direction of the fluid flow vertically or along the Z axis of the systems, i.e. in the X-Z plane, thus adding to the effects of the direction changes in the Z-Y plane as shown in FIG. 3B.

The invention also provides when used with pilot operated valve designs, for fluid isolation of the entire energy dissipating assembly including the sleeve 13, the nested rings 15 and the pilot valve 31 (FIG. 1). This is achieved by providing a lost motion coupling space 32 between the pin 33 which is carried by the solenoid armature shaft 34 of the pilot valve 31 and the upper body 35 of the main valve disc 10. When the valve is open, as shown in FIG. 1, the pin 33 will float in the space 32 in the disc body so that leakage fluid will surround every surface of the movable disc including the outer cylindrical surfaces indicated by the numerals 36a, 36b and 36c, the end surfaces 36d and 36e, the inner cylindrical bore 36f containing the pilot valve and its armature shaft 34 and the opening between the pilot valve 31 and its seat 31a. Pressure dropping stages in the form of cylindrical chambers 31b are provided on the lower end of the pilot valve to dissipate in stages the high energy of the fluid flow through the pilot valve when it is opened. Thus there is no metal-to-metal contact between the outer housing and the disc in which the energy is dissipated. The system will, therefore, operate more quietly than other prior art systems such for example as that shown in U.S. Pat. No. 4,249,574.

The invention has been illustrated and described in a range of variation and embodiments suggesting the wide range of pressure profiles which can be achieved by the programming ring, and at the same time achieving axial fluid flow direction changes as the fluid also moves radially and circumferentially in additional tortuous flow paths. Also shown is the ability to eliminate possibly unnecessary stages in the lower tiers of a given system. It should also be understood that while the invention has been shown in embodiments in which the high to low pressure flow is radially inward, i.e. the staging rings are nested inward from the sleeve 13, the staging rings can be assembled in outward nesting configurations, thus reversing the radial direction but otherwise not changing the principles and features of the invention. In such arrangement, the staging rings 16 (FIGS. 4 and 5) will have the chamber 20 formed in the lower inside corner to provide a radially inward facing expansion chamber to received the outward flow of expanding fluid. Also, while the ring 16 has been illustrated in one preferred geometry which has certain advantages in efficient machinery as well as assembly, it can take other configurations. For example, it can be formed with a central circumferential channel with upper and lower horizontal flanges joined by a vertical web (on the radially inner edge for nesting inside the sleeve 13 or on the outer edge for outside nesting). Also, the circumferential array of apertures can take the form of drilled holes or other shapes which might, however, be more costly to fabricate. The invention should not, therefore, be regarded as limited except as defined in the following claims.

What is claimed:

1. A multi-stage programmable pressure reducing assembly for high energy fluids comprising
   a cylindrical support sleeve having plurality of axially space apart tiers of circumferentially spaced apart radial passages for fluid flow,
   a plurality of pressure dropping, staging rings adapted to be carried concentrically by the sleeve stacked in tiers of nested, staging rings of progressively differing diameters to establish a plurality of pressure dropping stages, each ring having annular walls extending radially and axially to define at least a portion of an annular fluid flow channel,
   the axially extending wall of the ring having a plurality of circumferentially spaced apart radial fluid passages communicating with its annular fluid flow channel,
   said staging rings proximate to the sleeve being axially movable to bring their respective annular fluid flow channels into variably adjustable register with one corresponding array of circumferentially spaced apart radial passages in the sleeve,
   the nested rings being relatively axially movable to bring their respective annular channels into variably adjustable register to establish pressure dropping stages of selectable size, and
   programming spacer means to establish the degree of axial registration of the respective annular flow paths of the rings with the proximate radial fluid flowpassages, and
   means to secure the staging rings in fixed operating relationship,
   whereby the fluid flow from the high pressure side to the low pressure side will cause the flow to split and contract at the radial passages, to recombine in the annular flow paths with associated impingement and frictional losses and to change directions both circumferentially and axially, and whereby the pressure profiles at all stages of pressure reduction can be programmed by said spacer means.

2. Apparatus as set forth in claim 1 said pressure reducing assembly being part of a valve disc adapted to be movably mounted within a valve body having a fixed valve seat into which the said sleeve passes to allow the valve disc to seal against the seat, said sleeve, as the valve is progressively opened, presenting the tiers of the circumferentially spaced fluid passages successively to the fluid flow.

3. Apparatus as set forth in claim 2, the inside diameters of the inner most staging rings being selected to control fluid exit velocity from the valve.

4. Apparatus as set forth in claim 1 said programming spacer means comprising a programming disc at the inner end of the sleeve to engage the successive staging rings at the top of each tier to adjust the spacings and therefore the degree of registration of all stages independently.

5. Apparatus as set forth in claim 4 including supplemental programming spacer disc means between tiers below the first tier to change the registration of selected radial flow passages in subsequent tiers.

6. Apparatus as set forth in claim 1 in which there are different numbers of tiers in the respective pressures dropping stages.

7. Apparatus as set forth in claim 1 including disc means to secure the staging rings in the sleeve at the last tier of each stage.

8. Apparatus as set forth in claim 7, said disc means also serving to seal the annular flow path in the ring which is in the last tier of each stage.

9. Apparatus as set forth in claim 1 each staging ring comprising a substantially rectangular unitary member having substantially one corner position removed to define the annular fluid flow channel.

10. Apparatus as set forth in claim 9 said ring member being substantially square, with the thickness, measured axially, of the wall defining the radial portion of the channel corresponding approximately to the axial dimensions of the radial flow passages in the sleeve and in the ring.

11. Apparatus as set forth in claim 10 the radial fluid passages in the respective axially extending walls of the staging rings being equidistant and of equal size.

12. Apparatus as set forth in claim 1 the radial fluid passages in the staging rings being rectangular.

13. Apparatus as set forth in claim 1 the circumferential spacing of the radial flow passages of the successive stages of pressure drop being circumferentially spaced to cause the flow through each to divide substantially equally.

14. Apparatus as set forth in claim 1, said pressure reducing assembly comprising a valve having a housing said fluid inlet and outlet openings, a valve seat, main valve disc carrying said pressure reducing assembly, and a solenoid-operated pilot valve movably mounted in the main valve disc and coupled thereto by a lost-motion coupling, the invention comprising housing parts slidably receiving the main valve disc and the pressure reducing assembly carried thereby and affording fluid leakage paths between the fluid inlet and outlet which envelop the main valve disc, the pressure reducing assembly and the pilot valve and its lost motion coupling, whereby the energy coupling between the pressure reducer and the housing is substantially reduced.

15. Appararus as set forth in claim 14 pilot valve body having a series of fluid expansion chambers formed thereon in the path of fluid leakage between the pilot valve and the main valve disc, said pressure reducing assembly having an extension portion carried by said cylindrical support sleeve and having a series of fluid expandable chambers formed thereon in the path of fluid leakage between the pressure reducing assembly and the housing.

* * * * *